US 7,895,182 B2

(12) United States Patent
Ramberg

(10) Patent No.: US 7,895,182 B2
(45) Date of Patent: Feb. 22, 2011

(54) METHODS AND SYSTEMS FOR PERFORMING REDIRECTS TO A SEARCH ENGINE

(75) Inventor: Kenneth Craig O. Ramberg, Los Angeles, CA (US)

(73) Assignee: Goodsearch, LLC, Los Angeles, CA (US)

( * ) Notice: Subject to any disclaimer, the term of this patent is extended or adjusted under 35 U.S.C. 154(b) by 0 days.

(21) Appl. No.: 12/843,516

(22) Filed: Jul. 26, 2010

(65) Prior Publication Data

US 2010/0287072 A1 Nov. 11, 2010

Related U.S. Application Data

(63) Continuation of application No. 11/507,954, filed on Aug. 22, 2006, now Pat. No. 7,769,738.

(60) Provisional application No. 60/710,181, filed on Aug. 22, 2005, provisional application No. 60/737,477, filed on Nov. 17, 2005.

(51) Int. Cl.
*G06F 17/30* (2006.01)
*G06Q 30/00* (2006.01)
(52) U.S. Cl. ..................... 707/706; 705/14.1
(58) Field of Classification Search ............. 705/14.1; 707/706
See application file for complete search history.

(56) References Cited

U.S. PATENT DOCUMENTS 5,948,061 A 9/1999 Merriman et al.
6,269,361 B1 7/2001 Davis et al.
6,338,059 B1 1/2002 Fields et al.
6,978,263 B2 * 12/2005 Soulanille ........................ 1/1
2002/0165849 A1 * 11/2002 Singh et al. .................... 707/1
2003/0135460 A1 * 7/2003 Talegon ...................... 705/40
2005/0160002 A1 7/2005 Roetter et al.
2006/0080239 A1 4/2006 Hartog
2006/0206355 A1 9/2006 Cheung et al.
2006/0212437 A1 9/2006 Cunningham et al.
2006/0212447 A1 9/2006 Davis et al.

OTHER PUBLICATIONS

PCT International Search Report and Written Opinion dated Feb. 15, 2008 (International Application No. PCT/US06/32993, filed Aug. 22, 2006).
Ecology Fund, Frequently Asked Questions (htt://web.archive.org/web/20030416231824/ecologyfund.com/ecology/about_faq.html), Apr. 2003, pp. 1-8.

* cited by examiner

*Primary Examiner*—James Trujillo
*Assistant Examiner*—Jorge A Casanova
(74) *Attorney, Agent, or Firm*—Knobbe, Martens, Olson & Bear LLP

(57) ABSTRACT

The present invention is related to methods and systems for processing search requests and for performing searches over a network. In an embodiment, a recipient designation is received from a user over a network. The designation indicates that future searches performed by the user are to be associated with the recipient (even if the subject matter of the search is not related to the recipient). A search request is received from the user; causing a search to be performed in response to the search request. An identifier corresponding to the recipient is stored in association with an indication regarding the occurrence of the first search request.

72 Claims, 10 Drawing Sheets

GoodSearch

Charity Name*
Charity Description

Charity Category
- ☐ College
- ☐ Elementary School
- ☐ High School
- ☐ Middle School
- ☐ Military
- ☐ Nonprofit Charity Contact
Charity Address 1
Charity Address 2
Charity City
Charity State  AL
Charity Zip
Charity Phone
Charity E-mail
Your Name
Your E-mail

[Save] [Cancel]

* Required field

FIG. 4

GoodSearch

Charities | Report

Start Date [_____] 📅  End Date [_____] 📅

Choose by month [July] [____] / year [2005]  [Filter]  [Filter] Or

| Name | City | State | Hits | Percentage |
|------|------|-------|------|------------|
| Fern Brown Memorial Fund for American Cancer Society | Milwaukee | WI | 3 | 2.78% |
| American Cancer Society Inc. Tr 476 | New York | NY | 3 | 2.78% |
| Cedars-Sinai Medical Center | Los Angeles | CA | 2 | 1.85% |
| Painted Turtle Gang Camp Foundation | Malibu | CA | 1 | 0.93% |

FIG. 5

GoodSearch

Charities | Report

[(All statuses)] [CA] [cedars] [Search]

A | B | C | D | E | F | G | H | I | J | K | L | M | N | O | P | Q | R | S | T | U | V | W | X | Y | Z

Add Charity

| Name | City | State | Status | Created On | Edit | Delete |
|---|---|---|---|---|---|---|
| Cedars Cultural and Educational Foundation | Toluca Lake | CA | Active | 3/24/2005 10:59:28 PM | Edit | Delete |
| Cedars Development Foundation Parents Association | San Francisco | CA | Active | 3/24/2005 10:59:28 PM | Edit | Delete |
| Cedars of Marin | Ross | CA | Active | 3/24/2005 10:59:28 PM | Edit | Delete |
| Cedars-Sinai Medical Care Foundation | Beverly Hills | CA | Active | 3/24/2005 10:59:28 PM | Edit | Delete |
| Cedars-Sinai Medical Center | Los Angeles | CA | Active | 3/24/2005 10:59:28 PM | Edit | Delete |
| Cedars-Sinai Medical Center Section D. Fund | Los Angeles | CA | Active | 3/24/2005 10:59:28 PM | Edit | Delete |

GoodSearch

Charities | Report | Archive Report | Referrers | IP Blocking | Content | Log Off (All statuses) ▼  (All categories) ▼  (All states) ▼  Total Active Charities: 17058

[Search]  ☐ Ignore Starting Letters and Numbers

A|B|C|D|E|F|G|H|I|J|K|L|M|N|O|P|Q|R|S|T|U|V|W|X|Y|Z| Numbers  Add Charity

Give Searches by ID From [   ] To [   ]  [Reattribute]

Export E-mails of Charities  ● Created  ○ Edited  After [   ]  [Export]

| ☐ ID | Name | City | State | Status | Created On | | | |
|---|---|---|---|---|---|---|---|---|
| ☐ 1031 | A Bit of Freedom Therapeutic Riding Center | Agency | MO | Rejected | 3/24/2005 10:59:28 PM | Edit | Reset Searches | Delete |
| ☐ 1107 | A Bond of Love Adoption Agency Inc. | Sarasota | FL | Active | 3/24/2005 10:59:28 PM | Edit | Reset Searches | Delete |
| ☐ 1108 | A Bone Marrow Wish | Detroit | MI | Active | 5/26/2005 5:54:27 PM | Edit | Reset Searches | Delete |
| ☐ 1108 | A C Jones High School | Beeville | TX | Active | 3/24/2005 10:59:28 PM | Edit | Reset Searches | Delete |

GoodSearch

Charities | Report

Charity Name*  [Cedars-Sinai Medical Care Foundati]

Charity Description

Charity Category
- ☐ College
- ☐ Elementary School
- ☐ High School
- ☐ Middle School
- ☐ Military
- ☑ Nonprofit Charity Contact
Charity Address 1
Charity Address 2
Charity City  [Beverly Hills]
Charity State  [CA ☐]
Charity Zip
Charity Phone
Charity E-mail
Submitter Name
Submitter E-mail
Charity Status  [Active ☐]

* Required field  [Save] [Cancel]

FIG. 7

METHODS AND SYSTEMS FOR PERFORMING REDIRECTS TO A SEARCH ENGINE

PRIORITY CLAIM

This application is a continuation of U.S. application Ser. No. 11/507,954, filed Aug. 22, 2006, which claims priority from U.S. patent application Ser. No. 60/710,181, filed Aug. 22, 2005, and U.S. patent application Ser. No. 60/737,477, filed Nov. 17, 2005, the contents of which are incorporated herein in their entirety.

BACKGROUND OF THE INVENTION

1. Field of the Invention

The present invention is related to systems and methods for processing search requests and for performing searches over a network.

2. Description of the Related Art

The World Wide Web includes Internet servers hosting Web pages. A Web page may include, for example, links to other Web pages or resources, text, graphics, audio, and/or video content. A Uniform Resource Locator (URL) provides or indicates that address to a resource, such as Web page. There are currently several billion Web pages.

In order to aid users locate Web page information, a variety of search engines have been developed and deployed. Search engines typically index Web pages, and provide a search interface that can be accessed at a corresponding URL via a user browser or otherwise. The search interface can include a search field, via which a user can enter search terms. The search engine then searches for Web pages that correspond to the search terms. The search results, or a portion thereof, are then returned to the user via the user browser.

Certain search engine provide pay per click, or PPC, advertising. Pay per click advertisements may be in the form of advertisements placed adjacent to the search results. When a user clicks on the advertisement, the advertiser may be charged. Similarly, certain search engines provide pay for placement and pay for ranking, wherein a customer can pay the search engine operator to achieve higher or more prominent placement in the search results.

SUMMARY OF THE INVENTION

The present invention is related to systems and methods for processing search requests and for performing searches over a network.

An example embodiment provides a system for redirecting search requests over a network, the system comprising: a database that stores identification information for a plurality of recipients, wherein the recipients are eligible to receive a benefit as the result of searches performed by individuals; and program code stored in computer readable memory configured to: provide a user interface to a user terminal via which a user can identify a recipient; determine if the recipient identified by the user corresponds to a recipient identifier stored in the database; store an association between the user terminal and the identified recipient; receive a search request from the user; store an indication that the search request was received in association with identified recipient information; forward the search request to a Web site associated with a search engine; determine a payment allocation with respect to the identified recipient based at least in part on the indication that the search request was received from the user.

An example embodiment provides a method of redirecting search requests over a network, the method comprising: receiving over a network a recipient designation manually provided by a user, wherein recipients are eligible to receive a benefit as the result of searches performed by individuals; storing the recipient designation in computer readable memory; receiving at a first website a first search request from the user; forwarding the first search request to an second Internet site associated with a search engine, wherein the search engine will generate search results at least partly based on the forwarded first search request; storing in association with an identifier corresponding to the recipient an indication regarding the occurrence of the first search request; and allocating a payment to the recipient based at least in part on the indication.

An example embodiment provides a method of redirecting search requests over a network, the method comprising: receiving a recipient designation from a user over a network; searching a database to determine if a record exists in the database for the designated recipient; if the database includes a record for the designated recipient, storing an indication that the user designated the recipient in computer readable memory; receiving at a first website a first search request from the user; providing the first search request to a second site associated with a search engine, wherein the search engine will generate search results at least partly based on the first search request; storing in association with an identifier corresponding to the recipient an indication regarding the occurrence of the first search request; and allocating a payment to the recipient based at least in part on the indication.

An example embodiment provides a method of processing search requests over a network, the method comprising: receiving a recipient designation from a user over a network that indicates that future searches performed by the user are to benefit the recipient (even if the subject matter of the search is not related to the recipient); determining or identifying if the recipient is a non-profit entity; receiving at a first website or toolbar a first search request from the user; causing a search to be performed in response to the first search request; storing in association with an identifier corresponding to the recipient an indication regarding the occurrence of the first search request; and allocating a payment to the recipient based at least in part on the indication.

BRIEF DESCRIPTION OF THE DRAWINGS

Exemplary embodiments are illustrated in the accompanying drawings, which are for illustrative purposes only. The drawings comprise the following figures, in which like numerals indicate like parts.

FIG. 4 illustrates a recipient submission form.
FIG. 5 illustrates an example report.
FIGS. 6A-B illustrate example administration forms.
FIG. 7 illustrates another example administration form.

DETAILED DESCRIPTION OF PREFERRED EMBODIMENTS

The present invention is related to systems and methods for processing search requests and for performing searches over a network, such as by optionally redirecting search queries to a search engine.

Throughout this disclosure, the term "website" is used to refer to a user-accessible server site that implements the basic World Wide Web standards for the coding and transmission of hypertext documents. These standards currently include the hypertext markup language (HTML) and the hypertext transfer protocol (HTTP). The term "site" is not intended to imply a single geographic location, as certain websites or other network sites include multiple geographically distributed computer systems that are appropriately linked together. Furthermore, while this disclosure describes certain embodiments that use the Internet and related protocols, other networks, such as networked interactive televisions, and other protocols are used in other embodiments.

Additionally, unless otherwise indicated, the functions described herein are performable by software modules including executable code and instructions running on one or more general purpose computers. In an exemplary embodiment, the computers include one or more central processing units that execute program code and process data. The computers also include memory, including one or more of volatile memory (such as random access memory for temporarily storing data and data structures during program execution), non-volatile memory (such as a hard disc drive, optical drive, or flash drive, for storing programs, data, and databases), and one or more network interfaces for accessing an intranet and/or Internet.

The computers optionally include a display for displaying user interfaces, data, photographs, images, and the like. In certain embodiments, the computers also include one or more user input devices, such as a keyboard, mouse, pointing device, microphone and the like, used to navigate, provide commands, enter information, and the like. However, other embodiments are implemented using special purpose computers, state machines, and/or hardwired electronic circuits. Additionally, the example processes described herein do not necessarily have to be performed in the described sequence, and not all states have to be reached or performed.

Furthermore, where this disclosure refers to "clicking on" a link or button, or pressing a key in order to provide a command or make a selection, in other embodiments the commands or selections are made using other input techniques, such as using voice input, pen input, or mouse input, including hovering over an input area, selecting menu options, and the like.

Figure 1:
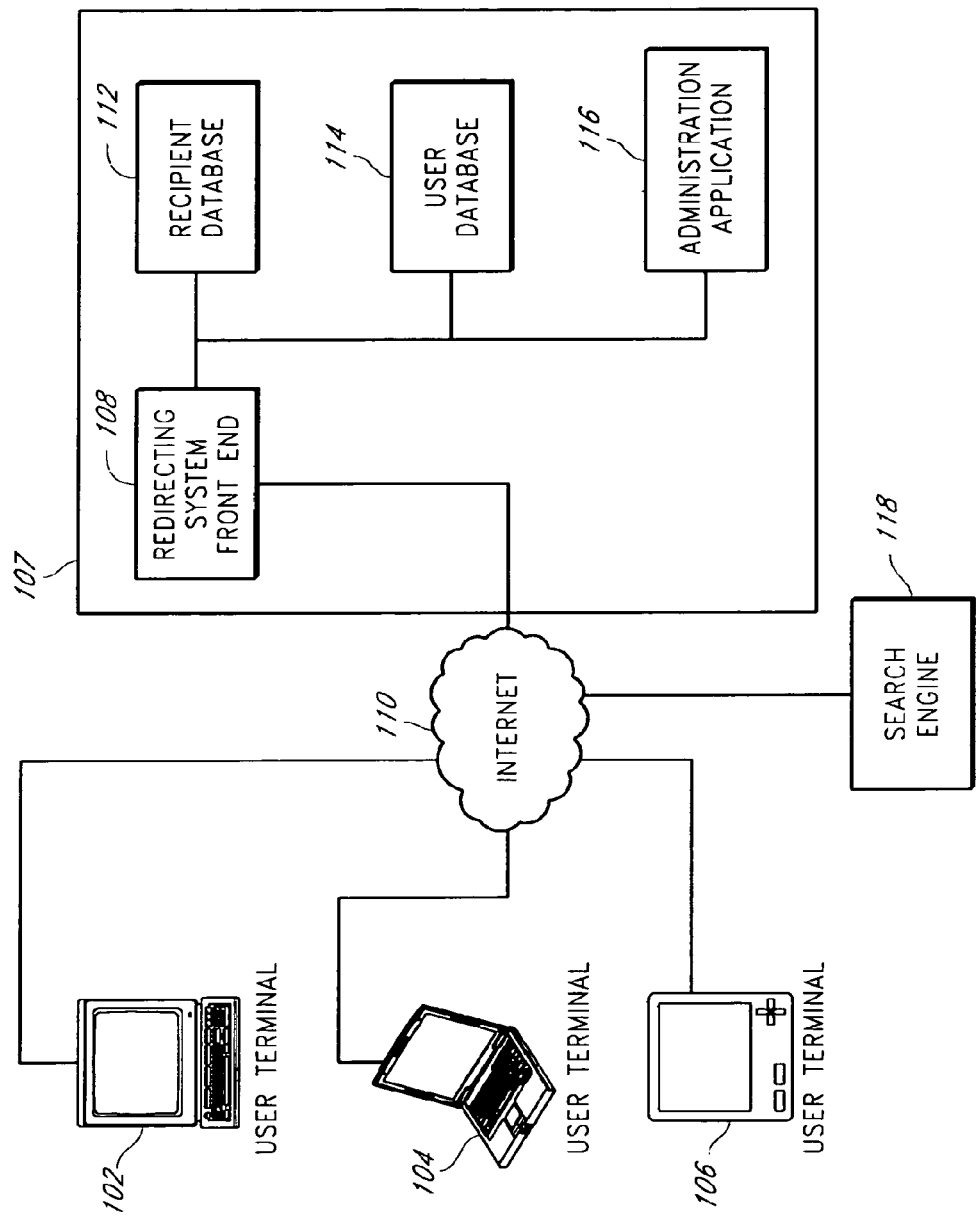
FIG. 1 illustrates an example networked system.

FIG. 1 illustrates an example system embodiment that can be used in conjunction with the processes described herein. Other systems and architectures can be used as well. With reference to FIG. 1, one or more user terminals 102, 104, 106 are coupled to a redirection system 107 over a network 110, such as the Internet. By way of example, a user terminal can be a personal computer, a networked personal digital assistant, a networked, interactive television or other entertainment system, a wireless or wired phone, and so on. The user terminals can host a browser or other appropriate network resource user interface.

The example redirection system 104 includes a front end server 108 that handles communications with user terminals, serves Web pages, and performs search request forwarding. The example redirection system 107 further includes a user database 114 and a recipient database 112. Optionally, the user and recipient databases are implemented as a single data store. The term "recipient" will be explained in greater detail below. The example redirection system 107 hosts an administration application 116, which tracks the number of hits received for each recipient, provides for entry and maintenance of recipient information, and generates reports.

The redirection system 107 can be used to redirect search requests entered into a search field on a redirection system Web page to a search engine 118. Optionally, the search engine 118 can be operated by a third party. By way of example, the search engine 118 can be a general purpose search engine, such as that operated by Google or Yahoo, or can be a special purpose search engine, such as a shopping comparison search engine that checks prices at various online stores or locates e-commerce outlets based on a user product-related query, such as Nextag, Pricecomparison.com, or Froogle. Other examples include search engines that search news Web sites, blog sites, and/or that search for photographs, videos, music, or other content. Optionally, the search engines may be configured to narrow a search to a particular type of content (e.g., news, blogs, photographs, videos, music, etc.) or to several user specified types of content. The redirection system 107 can further be used to redirect queries to an electronic commerce site (e.g., an online store, shopping comparison website, product review site, music, video, and/ or image download site, etc.) or other types of websites that pay commissions or referral fees for such redirection or referral. Optionally, certain users can be blocked from utilizing the redirection system. For example, certain IP (Internet Protocol) addresses known or suspected to be associated with users trying to cheat or abuse the system (e.g., by performing searches using robots to increase funds allocated to a recipient) can be blocked. Optionally, if fraudulent search activity is detected which is being performed on behalf of a designated recipient, the designated recipient is delisted and will not receive further recipient funds via the process described herein.

The redirection system 107 can forward or redirect a search query (e.g., in the form of a text search string) by adding the URL associated with the search engine 118 to the URL (or other identifier) associated with the redirection system and the query. For example, if the search query phrase/string is "movies", and the URL for the redirection system website is www.goodsearch.com, and the URL for the search engine is www.searchengine.tdl, then redirection system 107 may redirect the search request using the example URL:

www.searchengine.tdl/ custom?q=movies%2F~www.goodsearch.com.

As will be discussed in greater detail below, a user can select an eligible recipient (e.g., a charity or non-profit entity) via the redirection system 107. When the user thereafter performs a search using the search engine 118 by going through the redirection system 107, the selected recipient will accrue, receive and/or be entitled to a fee.

By way of illustration, the search engine or electronic commerce site operator may agree to pay an amount to the redirection system operator periodically or for a certain period of time (e.g., a month, a quarter, etc.) at least partly in exchange for searches routed to the search engine 118 via the redirection system 107. By way of example, the amount can be a fixed amount per period and/or the amount can be based on the number of searches directed to the search engine 118 by the redirection system 107. The redirection system operator can then divide the amount, or a portion thereof, among the designated recipients based, in part, on the number of times users that have selected the recipient perform a search via the search engine. For example, for Recipient$_A$, the fee allocation can be calculated as follows:

Recipient fee for Recipient$_A$=(total amount to be paid to recipients for a selected time period)×(number of eligible searches performed by users that have selected Recipient$_A$)/(total number of eligible searches)

Thus, when a user performs a search via the redirection system Web site, the redirection system determines who the user had designated as a recipient, and counts the search as a "hit" for that recipient. The redirection system operator can then periodically make payments to recipients based on the recipient fee calculation (e.g., every month, quarter, year, etc.).

Advantageously, using the foregoing example fee allocation process, the search engine operator (or other commerce site operator to which the user was redirected) does not need to track which users performed a search and does not need to be aware of the identity of the recipients. Further, because the search engine operator is optionally not aware of the identity of the recipients, the user's privacy is better assured. However, in other embodiments, the search engine or other operator can be provided with information regarding the user and/or the designated recipient for a given search request.

For example, optionally, in addition to an identifier associated with the redirection system 107 (e.g., www.goodsearch.com), the redirection system 107 can include an identifier related to the user and/or an identifier related to recipient in the redirected search request URL. This information enables the search engine 118 to track the number of searches forwarded by the redirection system 107, the number of searches originated with the user, and/or the number of searches for which a given recipient will benefit. The search engine 118 can store the foregoing information in its own data store. Optionally, the search engine operator can base current or future payments to the redirection system operator, the designated recipient, and/or the user based on some or all of the foregoing tracked information.

The amount paid to recipients can be performed by different processes as well. For example, the recipient may receive a percentage of the fee the search engine operator receives for a given search or that a commerce site makes for a sale. By way of further example, the recipient may receive a fixed amount per month, per year, or per other designated period for each user that selected the recipient. Optionally, payment is made to the recipient only if the amount due to the recipient is equal to or greater than a predetermined threshold (e.g., $50 or $100).

The user database 114 will now be described. The user database 114 is used to store user information. For example, the user database 114 can store user identification information. The user identification can include one or more of a cookie ID, a user identifier, and/or a password. By way of example, a cookie can be packet of information sent by the redirection system 107 to the user browser and stored on the user terminal. The cookie can then be sent back to the redirection system 107 by the browser when the browser accesses the redirection system 107. The cookie is optionally used to automatically authenticate or identify the user of the redirection system 107 as part of their initial site registration or login process without requiring the user to manually sign in. Optionally, the cookie does not identify a person individually, but identifies the combination of the terminal and the web browser.

Optionally, the user can be requested to enter a user identifier and/or a password into a logon interface provided by the redirection system 107 via the user browser. The redirection system 107 can then compare user identifier and/or password with that stored in the user database to identify the recipient previously selected by the user. This will enable the user to access the redirection system 107 and accrue fees for the user's designated recipient, while utilizing different terminals which do not have the user's original cookie stored thereon and without having to reselect the recipient. The user database 114 can optionally also store an identifier associated with the eligible recipient selected by the user in association with an identifier corresponding to the user.

The example recipient database 112 will now be described. The recipient database 112 includes identifiers and related information for "recipients" (e.g., active eligible recipients of search generated revenues, pending recipient submissions that have not yet been approved, rejected entities that have been determined to be non-eligible to be recipients, etc.) which can be stored in the form of records. For example, the recipient database 112 can include the recipient name, description, category (e.g., college, high school, middle school, elementary school, orphanage, military, non-profit, religious, etc.), recipient contact person, recipient address, recipient phone number, recipient email address, submitter name (the user that requested that the recipient be added to the database), submitter email, other submitter contact information, recipient status (e.g., active, pending, rejected, hidden). In this example, "hidden" can mean that the recipient is inactive. For example, a charity or other recipient that has money accrued but is no longer active (e.g., no longer in existence or unable to receive the money).

The recipient eligibility criteria can, for example, optionally require that the recipient be a non-profit entity, a public charity, a school, a hospital or meet other criteria. By way of further example, and not limitation, the criteria can optionally include the presence of the recipient's name on a government list of non-profits or charities, such as Publication 78, Cumulative List of Organizations described in Section 170(c) of the Internal Revenue Code of 1986. Thus, for example, an eligibility check can be performed automatically by the redirection system 107 accessing a government or other list of approved charities, or the eligibility check can be performed manually.

Figure 3:
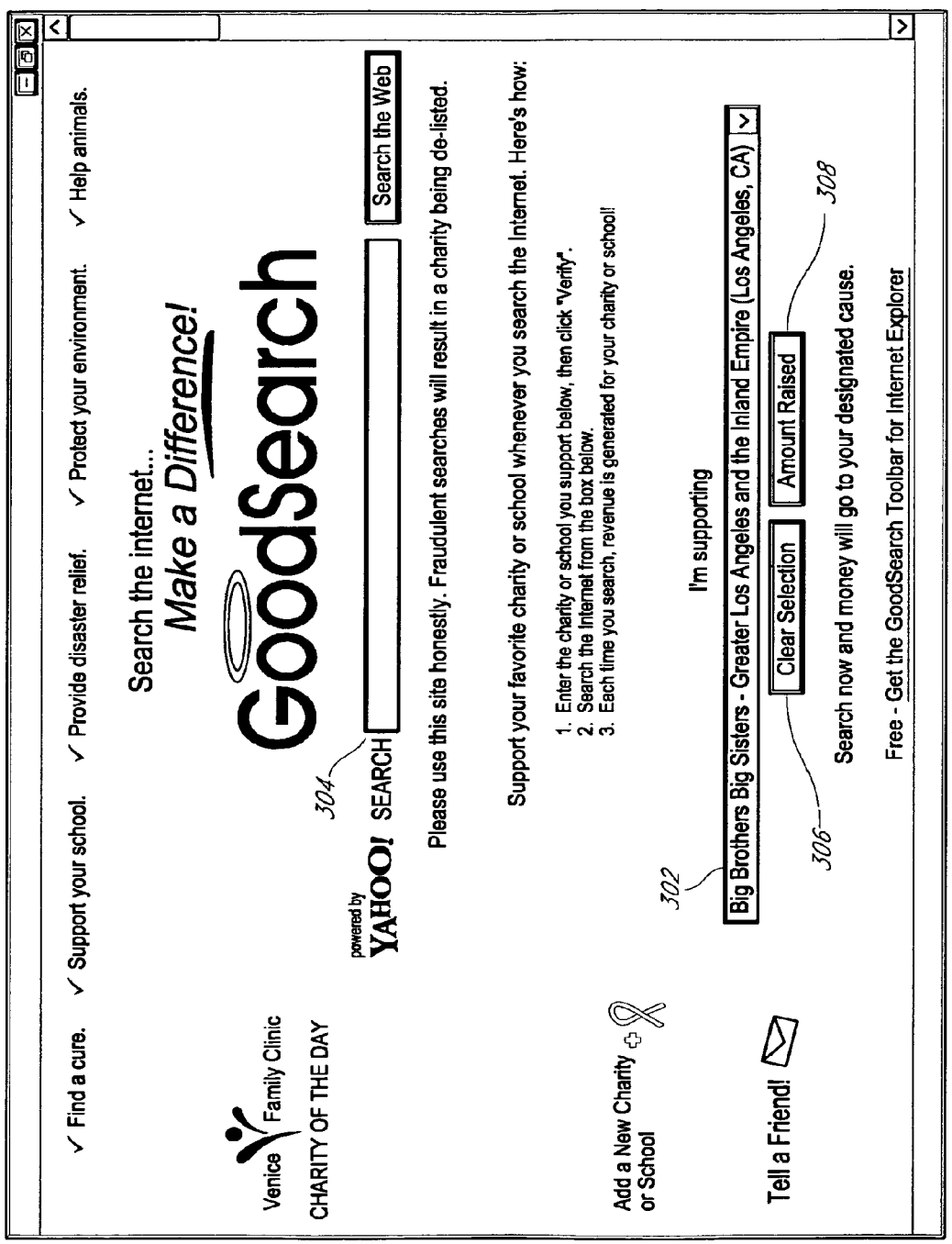
FIG. 3 illustrates an example recipient selection form.

Several example user and administrator interfaces will now be described. FIG. 3 illustrates an example recipient selection form which can optionally be provided as a Web page to the user terminal. A selection field 302 is provided via which a user can enter a recipient name (e.g., a charity, school, or other recipient). The redirection system 107 then searches the recipient database 112 to determine if the recipient is eligible to receive search generated fees. The search optionally will locate recipients that include any of the search terms entered by the user and display the results to the user in the order of relevance, or alphabetically, or otherwise ordered. The user can then select a recipient from the list by clicking on a recipient name or select button or link.

If the redirection system 107 fails to locate any matches for the recipient name entered by the user, or the recipient has a rejected status, the user is so informed and the user can attempt to submit another name. In addition, a listing of eligible recipients can be displayed to the user, and the user can click on a select button or link to thereby select a recipient. The user can optionally request that the listing be alphabetically sorted, sorted by state, sorted by category, or by other fields.

Optionally, the user can click on a link, such as a "add charity" field (not shown), via which the user can request that an entity be added to the eligible recipient list using a form, such as that illustrated in FIG. 4. The user can activate a "clear selection" control 306 to delete the current entry in the charity selection field 302. The user can activate an "amount raised" control 308 and the system will generate a report listing the total amount of charity raised overall and/or in a specified period for the charity listed in field 302.

As depicted in FIG. 3, a search field 304 is further provided via which the user can search the Web (or other target data source). This search field is optionally also provided on a separate Web page that does not include the recipient selection field. The separate Web page optionally includes a logo or other identifier associated with the redirection system operator/owner and optionally further includes a logo or other identifier associated with the search engine operator/owner. As described elsewhere herein, the search field can also be provided via a toolbar.

Even though the separate Web page with the search field may be used to provide the search terms to the search engine 118, the URL displayed in the user's browser will optionally be that associated with the redirection system 107, rather than that of the search engine 118. Thus, in one embodiment, URL cloaking is optionally used, that uses an HTML frame set. For example, the displayed URL can be:

http://www.goodsearch.com and the URL of the hidden frame is:

http://www.searchengine.tld/~goodsearch.com.

This cloaking technique will leave http://www.goodsearch.com in the user browser's address bar.

FIG. 4 illustrates an example recipient submission form via which a user can propose that an entity be added as an eligible recipient. In this example, the form has been configured for entities that are charitable or non-profit. The example form includes fields via which the user can enter one or more of the proposed recipient name, description, the recipient category (e.g., college, elementary school, high school, middle school, military, nonprofit, etc.), a recipient contact, recipient address, recipient phone number, recipient email, the user's name, and the user's email address. Other fields can be provided as well, such as a tax ID field. If the submitted entity meets the recipient eligibility criteria, the redirection system can add the entity, and the corresponding information provided by the user, into the recipient database 112 with an active status. If the submitted entity does not meet the recipient eligibility criteria, the redirection system can add the submitted entity, and corresponding information provided by the user, into the recipient database 112 with a rejected status.

The administration application 116 and associated user interfaces will now be described in greater detail. The administration application 116 tracks how many times a given eligible recipient was selected by users, and how many times the corresponding users conducted a search. For example, when a user accesses the redirection system website, the redirection system 107 reads the user's cookie to access the cookie ID (or optionally determines which user is accessing the website via a user ID and/or password entered into corresponding webpage fields), and based on the identification information, determines which entity the user had previously selected as the recipient. Optionally instead, the recipient identifier can be stored in the user cookie and retrieved by the redirection system 107. In either case, if the user then performs a search using the search engine 118, the administration application 116 records a "hit" in the recipient database 112 in association with the recipient record. Optionally, the redirection system 107 can identify and record which user is responsible for a given hit and store such information in the recipient and/or user databases.

The redirection system 107 also provides administration functions used to generate reports and administer the recipient database 112. Optionally, to access the administration functions, a user may need to enter authorization information, such as a user ID and password. The administration application 116 optionally includes a report generator that provides an activity report that provides some or all of the following information: the recipient name, the recipient state, the recipient city, the number of hits (the number of times a user who has selected the recipient performed a search via the redirection system), and the current percentage of hits for the recipient as compared to a total number of hits for all eligible recipients (or a selected subset thereof). FIG. 5 illustrates an example activity report.

As illustrated in FIG. 5, fields are provided via which a report requester can specify the start and end dates for which the report is to be generated, or the month and the year of which the report is to be generated. If the report is for a requested period, the number of hits reported will be for the hits that occurred during the requested period, and the percentage will be the percentage of hits for the recipient during that period as compared to a total number of hits for all eligible recipients (or a selected subset thereof) during that period. By way of further example, for a given charity (or as a total) for a selected time frame, the report can provide some or all of the following information:

The number of searches performed;

The number of times a link in search results were clicked on (or otherwise selected) by a user;

The percent of total searches a given recipient received credit for;

The percent of total search result "link clicks";

The report can be presented on a terminal screen via a browser, printed out, or otherwise presented.

When the activity report is electronically presented on a terminal screen, the activity report can be sorted by clicking on a desired field. For example, clicking on the "name" field causes the report to be sorted by recipient name. Similarly, clicking on the "percentage" field causes the report to be sorted by percentage. Optionally, the report generator can generate a report that lists the users that have selected a given recipient.

In addition, an entity administration form is provided by redirection system 107 that lists the entities stored in the recipient database 112. The report can list the name, city, state, status, and record creation date for that entity. An administrator can delete an entity record by activating the delete control, or edit an entity record by activating the edit control. The administrator can request a filtered list based on entity status, entity category, entity state, and a search term (e.g., part of an entity name) by entering or selecting the filter criteria via corresponding filter fields and by activating the search control. FIG. 6A illustrates an example entity report filtered to only display those entities that include the string "cedars". In this example, the entities are charitable entities. FIG. 6B illustrates another example report listing recipients whose names being with the letter "A". A "reset searches" control is provided via which an administrator can reset to zero the search total (e.g., the number of hits) for the corresponding recipient.

FIG. 7 illustrates an example entity form which can be used to enter or edit entity information stored in the recipient database 112. The example form includes fields for the recipient name, description, the recipient category (e.g., college, elementary school, high school, middle school, military, nonprofit, etc.), a recipient contact, recipient address, recipient phone number, recipient email, the submitting user's name, the submitting user's email address, and the recipient status (e.g., active, pending, rejected, hidden). Other fields can be provided as well, such as a tax ID field (not shown).

Figure 2:
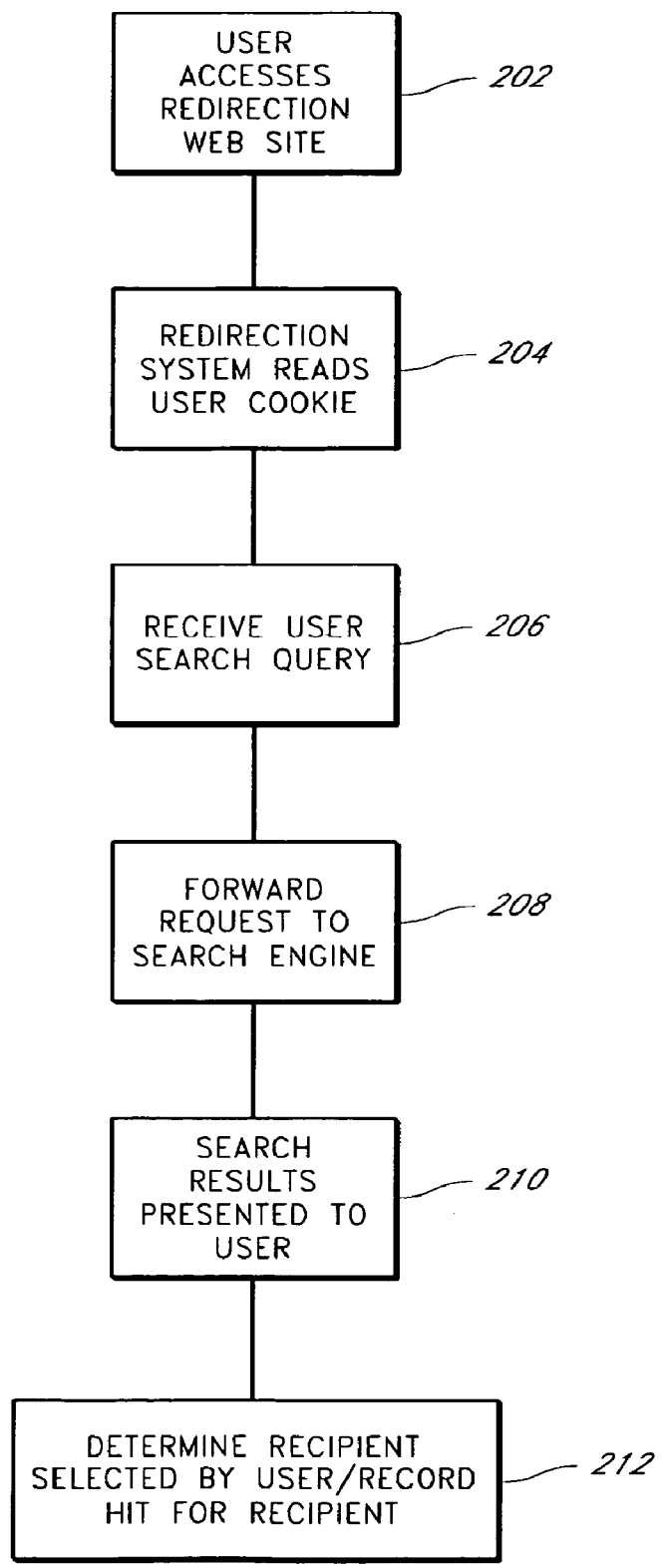
FIG. 2 illustrates an example process for redirecting search queries and for tracking the same.

FIG. 2 illustrates an example search redirection process. At state 202, a user accesses the redirection system website via a browser. At state 204, the redirection system reads a cookie from the user terminal. At state 206, the redirection system receives a search query from the user. At state 208, the redirection system forwards the search request to the search engine by prefixing the redirection system URL with the search engine URL, with the search query embedded in the combined URLs. At state 210, the search results are presented to the user. At state 212, the redirection system determines which recipient the user had designated, and records a hit for that recipient.

While the above example includes a redirection system that redirects queries to a search engine, in another embodiment, the search engine itself provides the functionality of the redirection system, except that the redirection itself need not be provided. For example, the search engine can include the recipient and user databases, as well as the administrative application. Thus, the search engine can provide the user interface that allows a user to designate recipients, track hits associated with recipients, calculate percentages of payment allocations per recipient, receive and process requests to add eligible recipients, provide payments to eligible recipients, perform some or all of the other functions described elsewhere herein, etc.

Optionally, a toolbar may be downloaded for the redirection system site, a search site, or from another site to the user terminal (e.g., by activating a toolbar download link presented via the homepage illustrated in FIG. 3). For example, the toolbar can be downloaded to, and visible from the user terminal browser (e.g., docked to the browser), the terminal desktop, a word processor, email client, or otherwise. A charity selection field (e.g., in the form of a drop-down menu or a search field) is optionally provided via which the user can select a charity. By way of example, the charity selection process can optionally be performed as described above with respect to FIG. 3. For example, a user can enter a recipient name (e.g., a charity, school, or other recipient). The redirection system then searches the recipient database to determine if the recipient is eligible to receive search generated fees. The search optionally will locate recipients that include any of the search terms entered by the user and display the results to the user in the order of relevance. The user can then select a recipient from the list by clicking on a recipient name or select button or link. Once the charity name appears in the charity selection field, the user can activate a select charity button, and the selected charity will be the recipient of benefits received as a result of searches performed by the user via the toolbar search field, described below. Optionally, the toolbar does not include a charity field. For example, for certain browsers the toolbar optionally does not include a charity field, while for other browsers the toolbar optionally does include the charity field. Optionally, the user may select (e.g., via a toolbar menu) whether the toolbar displays the charity field. Optionally, the system accesses the cookie generated and stored on the user's computer (when the user selected the charity on the system homepage), and when the user later performs a search using the toolbar or Web page, the system accesses the cookie, reads the charity recipient designation stored therein, and credits the charity accordingly.

A keywords search field is optionally provided via which the user can provide search terms. A control is provided via which the user can select which search engine (e.g., Yahoo, Google, MSN, etc.) is to be used to perform the search. When the user submits a search request, the redirection system performs the redirection process to the search engine as described herein, and tracks the searches to generate revenue for the selected charity.

Figure 8A:
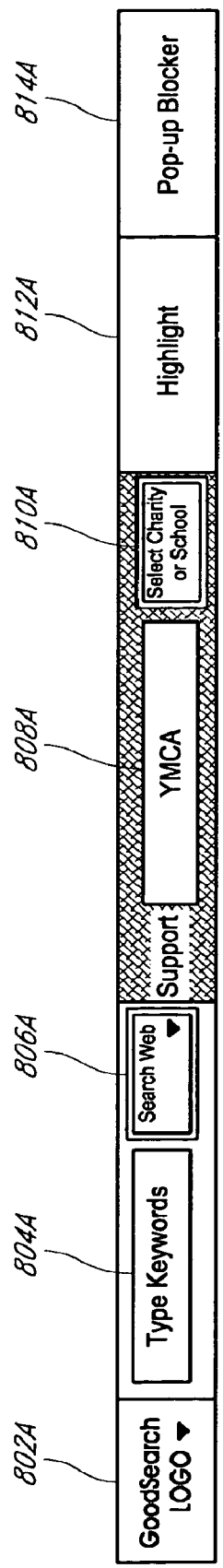
FIG. 8A-B illustrates example search tool bars.
Figure 8B:

Optionally, a control is provided via which the user can clear the search history of searches performed using the toolbar. Optionally, a support control is provided, that when activated, displays help information and/or generates an email in which the user can insert text identifying a problem or issue and asking for help. Optionally a control is provided, which, when activated by the user, causes a home page or other Web page associated with the redirection system to be presented. Optionally, the toolbar includes a pop-up blocker control and software which, when activated by the user, causes pop-up windows to be blocked. Optionally, a highlight control is provided as well. An example toolbar is illustrated in FIG. 8A, which includes a logo 802A associated with the redirection system operator, a search field 804A (which optionally keeps a record of previous search terms entered by the user which can be recalled as the user enters a search term), a search activation control 806, a recipient selection field 808A, a select recipient control 810A (which, when activated by the user, causes the charity entered in field 808A to be submitted to the system), a highlight control 812, and a pop-up blocker control 814A. Additional, fewer, or different controls and/or fields can be provided. FIG. 8B illustrates another example toolbar similar to the illustrated in FIG. 8A.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A system for processing search requests received over a network, the system comprising:
   a data store that stores identification information for a first plurality of recipients, wherein the first plurality of recipients are eligible to receive a benefit at least partly as the result of searches performed by individuals;
   a computing device; and
   program code stored in computer readable memory that when executed by the computing device is configured to:
      provide a user interface to a user terminal via which a user can identify a recipient at least from the plurality of recipients whose identification information is stored in the data store;
      receive a search request from the user over the network;
      store in a data store an indication relating to the search request received from the user terminal;
      facilitating a search to be performed corresponding to the search request;
      determine a payment allocation with respect to the identified recipient,
         wherein the payment allocation is related to the search request received from the user, wherein the user is same user providing the recipient designation,
         even when the search request subject matter is unrelated to the designated recipient.

2. The system as defined in claim 1, wherein the program code is further configured to:

provide the user with a Web page, the Web page including a field for designating a recipient and a field for receiving a search string,
wherein the first search request is forwarded using a string including a uniform resource locator associated with a search engine and a search string corresponding to the search request;
provide a second user with a toolbar, the toolbar including a field for designating a recipient and a field for receiving a search string;
determine if a record exists for at least one recipient designation received from at least one user; and
if a record does not exist for the at least one recipient designation, provide over the network to the at least one user a form with fields for receiving at least one recipient identifier and recipient contact information, including at least a recipient address, email address, or telephone number.

3. The system as defined in claim 1, wherein the user interface is provided via a Web page.

4. The system as defined in claim 1, wherein the user interface comprises a Web page that includes:
a field configured to receive at least one recipient identifier; and
a field configured to receive a search string.

5. The system as defined in claim 1, wherein the program code is further configured to cause a toolbar to be provided to at least one user, wherein the toolbar is configured to be docked to a browser, the toolbar including a first interface via which the user can designate at least one recipient.

6. The system as defined in claim 1, wherein the user interface further comprises a toolbar.

7. The system as defined in claim 1, wherein the program code is further configured to block at least one user from causing at least one designated recipient from receiving a payment allocation as a result of a search performed by the at least one user.

8. The system as defined in claim 1, the system further comprising a price comparison search engine configured to process search requests.

9. The system as defined in claim 1, the system further comprising a search engine associated with an online store.

10. The system as defined in claim 1, wherein the program code is further configured to generate a string including a uniform resource locator associated with the system, a uniform resource locator associated with a search engine Internet site, and a search string corresponding to the search request.

11. The system as defined in claim 1, wherein the program code is further configured to generate a string including a uniform resource locator, a search string corresponding to the search request, and an identifier associated with the system.

12. The system as defined in claim 1, wherein the program code is further configured to generate a string including a uniform resource locator, a search string corresponding to the search request, and an identifier associated with the recipient.

13. The system as defined in claim 1, wherein the user terminal is a wireless phone.

14. The system as defined in claim 1, wherein the user terminal is a personal computer.

15. The system as defined in claim 1, wherein the user terminal is a networked television.

16. The system as defined in claim 1, wherein the program code is further configured to store in computer readable memory a number of times a link in search results was activated by the user.

17. The system as defined in claim 1, wherein the program code is further configured to store in computer readable memory an association between the user terminal and the identified recipient to enable the recipient to receive at least one benefit at least partly as a result of the user conducting a search.

18. A method for processing search requests received over a network, the method comprising:
receiving over a network a recipient designation manually provided by a user,
wherein the recipient is eligible to receive a benefit at least partly as a result of an indication related to searches performed by the user, and
wherein the user is not the recipient;
storing the recipient designation in computer readable memory;
receiving at a first Internet site a first search request regarding a subject matter from the user,
wherein the search request subject matter is not related to the recipient;
facilitating a search corresponding to the first search request to be performed by a search engine,
wherein the search engine will generate search results at least partly based on the first search request;
storing an indication related to the first search request:
in association with an identifier corresponding to the user, or
in association with an identifier corresponding to the recipient, or
in association with the identifier corresponding to the user and in association with the identifier corresponding to the recipient; and
allocating a payment to the recipient,
wherein the payment allocation is related at least in part to the indication related to the first search request,
wherein the first search request is received from the same user that provided the recipient designation.

19. The method as defined in claim 18, the method further comprising:
providing the user with a Web page, the Web page including a field for designating a recipient and a field for receiving a search string,
wherein the first search request is forwarded to the search engine using a string including a uniform resource locator associated with the search engine and a search string corresponding to the search request;
providing a second user with a toolbar, the toolbar including a field for designating a recipient and a field for receiving a search string;
determining if a record exists for at least one recipient designation received from at least one user; and
if a record does not exist for the at least one recipient designation, providing over the network to the at least one user a form with fields for receiving at least one recipient identifier and recipient contact information, including at least a recipient address, email address, or telephone number.

20. The method as defined in claim 18, the method further comprising blocking at least one user from causing at least one designated recipient from receiving a payment allocation as a result a search performed by the at least one user based at least in part on an IP address associated with the at least one user.

21. The method as defined in claim 18, the method further comprising providing the user with a Web page,
wherein the Web page includes:
a field for designating a recipient; and
a field for receiving a search string.

22. The method as defined in claim 18, the method further comprising providing the user with a toolbar,
the toolbar including:
a field for designating a recipient; and
a field for receiving a search string.

23. The method as defined in claim 18, the method further comprising:
determining if a record exists for at least one recipient designation received from at least one user; and
if a record does not exist for the at least one recipient designation,
providing over the network to the at least one user a form with fields for receiving at least one recipient identifier and recipient contact information, including at least a recipient address, email address, or telephone number.

24. The method as defined in claim 18, the method further comprising:
determining if a record exists for at least one recipient designation received from at least one user; and
if a record does not exist for the at least one recipient designation, providing over the network to the at least one user a form with a field for receiving a charity category indication.

25. The method as defined in claim 18, the method further comprising generating a report indicating how many hits were received for at least one recipient in a specified time period.

26. The method as defined in claim 18, the method further comprising generating a report indicating the percentage of hits received for at least one recipient in a specified time period relative to the total hits received for a plurality of recipients in the specified time period.

27. The method as defined in claim 18, wherein the search engine is a price comparison search engine.

28. The method as defined in claim 18, wherein the search engine is associated with an online store.

29. The method as defined in claim 18, wherein the first search request is forwarded using a string including a uniform resource locator associated with the search engine and a search string corresponding to the search request and the uniform resource locator associated with the search engine is inhibited from being displayed to the user.

30. The method as defined in claim 18, wherein the first search request is forwarded using a string including a uniform resource locator associated with the search engine and a search string corresponding to the search request.

31. The method as defined in claim 18, wherein the search results are presented via a Web page that includes an identifier associated with the first web page.

32. The method as defined in claim 18, wherein the search results are presented via a Web page that includes an identifier associated with the first web page and an identifier associated with the search engine, wherein the identifier associated with the first web page is different than the identifier associated with the search engine.

33. The method as defined in claim 18, wherein the recipient designated by the user is a non-profit entity.

34. The method as defined in claim 18, the method further comprising:
tracking the total hits associated with the user designated recipient over a first period of time; and
making a payment to the recipient based at least in part on the number of total hits.

35. The method as defined in claim 18, the method further comprising making a payment to the user designated recipient only when the payment allocated to the recipient reaches or exceeds a first threshold, wherein the first threshold is greater than zero.

36. The method as defined in claim 18, the method further comprising storing an indication that the recipient is a non-profit institution.

37. The method as defined in claim 18, the method further comprising causing a uniform resource locator associated with the first Internet site to be displayed by a browser when the search results from the search engine are displayed to the user.

38. The method as defined in claim 18, the method further comprising providing the user with a search engine selection user interface.

39. A method of processing search requests, the method comprising:
receiving, at a networked computer system, a recipient designation from a user over a network, wherein the designated recipient is not the user;
storing an indication that the user designated the recipient in computer readable memory;
receiving at a at a networked site a first search request from the user;
providing the first search request to a search engine,
wherein the search engine will generate search results at least partly based on the first search request;
storing an indication related to the first search request from the user:
in association with an identifier corresponding to the user, or
in association with an identifier corresponding to the recipient, or
in association with the identifier corresponding to the user and in association with the identifier corresponding to the recipient; and
allocating a payment to the recipient based at least in part on the recipient designation and the indication related to the first search request from the user, the user being the same user that provides the recipient designation,
even when the first search request subject matter is unrelated to the designated recipient.

40. The method as defined in claim 39, wherein the payment to the recipient is related to a quantity of search requests from users that have designated the recipient.

41. The method as defined in claim 39, wherein payments to the recipient are made on a periodic payment.

42. The method as defined in claim 39, wherein the second Internet site does not store a user identifier.

43. The method as defined in claim 39, wherein the first Internet site transmits identification information for the user to the second Web site.

44. The method as defined in claim 39, providing over the network to the at least one user a form with fields for receiving at least one recipient identifier and recipient contact information if a record does not exist in the data store for the at least one recipient designation.

45. The method as defined in claim 39, the method further comprising generating a report indicating how many hits were received for at least one recipient in a specified time period.

46. The method as defined in claim 39, wherein the recipient designation is received by the user via a human perceptible form.

47. The method as defined in claim 39, wherein the recipient designation is received by the user via a toolbar docked to a browser.

48. The method as defined in claim 39, the method further comprising providing the user with a search engine selection user interface.

49. The method as defined in claim 39, the method further comprising storing an indication that the recipient is a non-profit institution.

50. A method of processing search requests, the method comprising:
receiving, at a computing system, a recipient designation from a user over a network that indicates that future searches performed by the user are to benefit the recipient,
wherein the user is not the recipient;
identifying the recipient as a non-profit entity;
receiving, at the computing system, via a Web page or via a toolbar a first search request from the user;
causing a search to be performed by a search engine in response to the first search request;
storing, in non-transitory computer readable memory, an indication relating to the occurrence of the first search request from the user in association with an identifier corresponding to the recipient; and
allocating a payment to the recipient based at least in part on an indication that the first search request was received from the same user that provided the recipient designation, even when the first search request subject matter is unrelated to the designated recipient.

51. The method as defined in claim 50, wherein the payment to the recipient is related at least in part to a quantity of search requests from users that have designated the recipient as a recipient.

52. The method as defined in claim 50, the method further comprising:
providing over the network to the at least one user a form with fields configured to receive at least:
one recipient identifier, and
recipient contact information;
and storing information received via the form in computer readable memory.

53. The method as defined in claim 50, the method further comprising generating a report indicating how many hits were received for at least one recipient in a specified time period.

54. The method as defined in claim 50, wherein the recipient designation is received by the user via a human perceptible form.

55. The method as defined in claim 50, wherein the recipient designation is received by the user via a toolbar docked to a browser.

56. The method as defined in claim 50, the method further comprising providing the user with a search engine selection user interface.

57. The method as defined in claim 50, the method further comprising storing a cookie on a terminal associated with the user, the cookie including at least one identifier associated with the user designated recipient.

58. The method as defined in claim 50, the method further comprising:
storing a cookie on a terminal associated with the user, the cookie including at least one identifier associated with the recipient;
accessing the cookie; and
using the cookie to determine which entity the user had previously designated as the recipient.

59. A system for processing search requests received over a network, the system comprising:
a computing device; and
program code stored in computer readable memory that when executed by the computing device is configured to performing operations comprising:
receiving over a network a recipient designation manually provided by a user,
wherein the recipient is eligible to receive a benefit at least partly as a result of an indication related to searches performed by the user, and
wherein the user is not the recipient;
storing the recipient designation in computer readable memory;
receiving at a first Internet site a first search request regarding a subject matter from the user,
wherein the search request subject matter is not related to the recipient;
facilitating a search corresponding to the first search request to be performed by a search engine,
wherein the search engine will generate search results at least partly based on the first search request;
storing an indication related to the first search request:
in association with an identifier corresponding to the user, or
in association with an identifier corresponding to the recipient, or
in association with the identifier corresponding to the user and in association with the identifier corresponding to the recipient; and
allocating a payment to the recipient,
wherein the payment allocation is related at least in part to the indication related to the first search request,
wherein the first search request is received from the same user that provided the recipient designation.

60. The system as defined in claim 59, the operations further comprising:
providing the user with a Web page, the Web page including a field for designating a recipient and a field for receiving a search string,
wherein the first search request is forwarded to the search engine using a string including a uniform resource locator associated with the search engine and a search string corresponding to the search request;
providing a second user with a toolbar, the toolbar including a field for designating a recipient and a field for receiving a search string;
determining if a record exists for at least one recipient designation received from at least one user; and
if a record does not exist for the at least one recipient designation, providing over the network to the at least one user a form with fields for receiving at least one recipient identifier and recipient contact information, including at least a recipient address, email address, or telephone number.

61. The system as defined in claim 59, the operations further comprising providing the user with a Web page,
wherein the Web page includes:
a field for designating a recipient; and
a field for receiving a search string.

62. The system as defined in claim 59, the operations further comprising providing the user with a toolbar,
the toolbar including:
a field for designating a recipient; and
a field for receiving a search string.

63. The system as defined in claim 59, the operations further comprising:
determining if a record exists for at least one recipient designation received from at least one user; and if a record does not exist for the at least one recipient designation, providing over the network to the at least one user a form with fields for receiving at least one recipient identifier and recipient contact information, including at least a recipient address, email address, or telephone number.

64. The system as defined in claim 59, wherein the first search request is forwarded using a string including a uniform resource locator associated with the search engine and a search string corresponding to the search request.

65. The system as defined in claim 59, wherein the search results are presented via a Web page that includes an identifier associated with the first web page.

66. A system for processing search requests received over a network, the system comprising:
  a computing device; and
  program code stored in computer readable memory that when executed by the computing device is configured to performing operations comprising:
    receiving, at a networked computer system, a recipient designation from a user over a network, wherein the designated recipient is not the user;
    storing an indication that the user designated the recipient in computer readable memory;
    receiving at a at a networked site a first search request from the user;
    providing the first search request to a search engine,
      wherein the search engine will generate search results at least partly based on the first search request;
    storing an indication related to the first search request from the user:
      in association with an identifier corresponding to the user, or
      in association with an identifier corresponding to the recipient, or
      in association with the identifier corresponding to the user and in association with the identifier corresponding to the recipient; and
    allocating a benefit to the recipient based at least in part on the recipient designation and the indication related to the first search request from the user, the user being the same user that provides the recipient designation,
    even when the first search request subject matter is unrelated to the designated recipient.

67. The system as defined in claim 66, the operations further comprising:
  providing the user with a Web page, the Web page including a field for designating a recipient and a field for receiving a search string,
  wherein the first search request is forwarded to the search engine using a string including a uniform resource locator associated with the search engine and a search string corresponding to the search request;
  providing a second user with a toolbar, the toolbar including a field for designating a recipient and a field for receiving a search string;
  determining if a record exists for at least one recipient designation received from at least one user; and
  if a record does not exist for the at least one recipient designation, providing over the network to the at least one user a form with fields for receiving at least one recipient identifier and recipient contact information, including at least a recipient address, email address, or telephone number.

68. The system as defined in claim 66, the operations further comprising providing the user with a Web page,
  wherein the Web page includes:
    a field for designating a recipient; and
    a field for receiving a search string.

69. The system as defined in claim 66, the operations further comprising providing the user with a toolbar,
  the toolbar including:
    a field for designating a recipient; and
    a field for receiving a search string.

70. The system as defined in claim 66, the operations further comprising:
  determining if a record exists for at least one recipient designation received from at least one user; and
  if a record does not exist for the at least one recipient designation,
  providing over the network to the at least one user a form with fields for receiving at least one recipient identifier and recipient contact information, including at least a recipient address, email address, or telephone number.

71. The system as defined in claim 66, wherein the first search request is forwarded using a string including a uniform resource locator associated with the search engine and a search string corresponding to the search request.

72. The system as defined in claim 66, wherein the search results are presented via a Web page that includes an identifier associated with the first web page.

* * * * *

UNITED STATES PATENT AND TRADEMARK OFFICE
CERTIFICATE OF CORRECTION

| | |
|---|---|
| PATENT NO. | : 7,895,182 B2 |
| APPLICATION NO. | : 12/843516 |
| DATED | : February 22, 2011 |
| INVENTOR(S) | : Kenneth Craig O. Ramberg |

It is certified that error appears in the above-identified patent and that said Letters Patent is hereby corrected as shown below:

Title Page 1, (Item 56), Col. 2, line 15, Under Other Publications, change "(htt://" to --(http://--.

Column 2, line 53, Change "same;" to --same.--.

Column 14, line 22, In Claim 39, after "receiving at a" delete "at a".

Column 17, line 25, In Claim 66, after "receiving at a" delete "at a".

Signed and Sealed this
Third Day of July, 2012

David J. Kappos
*Director of the United States Patent and Trademark Office*